(12) United States Patent
Laxton et al.

(10) Patent No.: US 8,608,998 B2
(45) Date of Patent: *Dec. 17, 2013

(54) INFRARED SOLVENT STRIPPING PROCESS

(75) Inventors: Christel Berta Laxton, Hopewell, VA (US); B. Lynne Wiseman, Richmond, VA (US); Christopher William Newton, Richmond, VA (US); Simon Frisk, Richmond, VA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 618 days.

This patent is subject to a terminal disclaimer.

(21) Appl. No.: 12/217,913

(22) Filed: Jul. 9, 2008

(65) Prior Publication Data

US 2010/0007063 A1 Jan. 14, 2010

(51) Int. Cl.
*B29C 47/00* (2006.01)
*B29C 67/00* (2006.01)
*B29B 15/00* (2006.01)

(52) U.S. Cl.
USPC ........ 264/233; 264/492; 264/203; 264/178 R; 528/497

(58) Field of Classification Search
USPC ............... 264/492, 233, 178 R, 203; 528/497
See application file for complete search history.

(56) References Cited

U.S. PATENT DOCUMENTS

| | | |
|---|---|---|
| 3,503,134 A | 3/1970 | Fleissner |
| 4,798,007 A | 1/1989 | Eichenlaub |
| 6,986,830 B2 | 1/2006 | Scherb et al. |
| 7,592,415 B2 * | 9/2009 | Hovanec et al. ............. 528/497 |
| 2002/0039637 A1 * | 4/2002 | Meece et al. .................. 428/103 |
| 2002/0092423 A1 | 7/2002 | Gillingham et al. |
| 2004/0011204 A1 * | 1/2004 | Both ................................ 96/66 |
| 2004/0016143 A1 * | 1/2004 | Cleary et al. .................... 34/394 |
| 2005/0056956 A1 | 3/2005 | Zhao et al. |
| 2008/0142737 A1 * | 6/2008 | Hovanec et al. ........... 250/492.1 |
| 2008/0146698 A1 | 6/2008 | Hovanec et al. |

FOREIGN PATENT DOCUMENTS

| | | |
|---|---|---|
| WO | WO 03/080905 | 10/2003 |
| WO | WO 03/080905 A1 | 10/2003 |
| WO | WO 2005/085730 | 9/2005 |
| WO | WO 2008/060424 | 5/2008 |
| WO | WO 2008/076412 | 6/2008 |

OTHER PUBLICATIONS

PCT International Search Report and Written Opinion for International Application No. PCT/US2008/069717 dated Jul. 11, 2008.

* cited by examiner

*Primary Examiner* — Milton I Cano
*Assistant Examiner* — Jeremiah Smith

(57) ABSTRACT

A process for stripping chemically bonded spinning solvent from a solution-spun nonwoven web comprising the steps of providing a nonwoven web comprising solvent-laden polymeric fibers having average fiber diameters of less than about 1 micrometer, and transporting the nonwoven web through at least one infrared solvent stripping station wherein infrared radiation irradiates the nonwoven web in the absence of a solvent stripping fluid impinging on the nonwoven web in order to reduce the solvent concentration of the fibers to less than about 10,000 ppmw.

7 Claims, 2 Drawing Sheets

INFRARED SOLVENT STRIPPING PROCESS

BACKGROUND

The process of solution spinning involves dissolving a desired polymer into a suitable solvent, and spinning fibers from the polymer/solvent solution. Often, the solvent is an organic solvent which has undesirable properties in use of the so-formed fabric, such as adverse health effects, undesired odor and the like.

Solution spinning processes are frequently used to manufacture fibers and nonwoven fabrics, and in some cases have the advantage of high throughputs, such that the fibers or fabrics can be made in large, commercially viable quantities.

In paper making processes, such as those disclosed in U.S. Pat. Nos. 3,503,134 and 6,986,830, dewatering of the wet laid cellulose fibers which form the paper is performed by passing the wet laid cellulose web over a vacuum-assisted porous drum, and the excess water from the forming process is drawn through and away from the paper web. U.S. Pat. No. 3,503,134 discloses the use of hot air, superheated steam or a steam-air mix to enhance the drying effect of the vacuum assist. U.S. Pat. No. 6,986,830 discloses positioning the wet laid paper web between two soft, porous cloth webs, wherein the porous cloths on either side of the paper web pull additional water from the paper by capillary action.

U.S. Published Patent Application No. 2002/0092423 discloses a solution spinning process for forming a nonwoven polymer web, in particular an electrospinning process, wherein polymeric microfibers or nanofibers are produced from a polymer solution exiting an electrically-charged rotating emitter and directed toward a grounded collector grid. The solvent is evaporated from the fibers "in flight" between the emitter and the collector grid.

SUMMARY OF THE INVENTION

In a first embodiment, the invention is a process for stripping chemically bonded spinning solvent from a solution-spun nonwoven web comprising the steps of providing a nonwoven web comprising solvent-laden polymeric fibers having average fiber diameters of less than about 1 micrometer, and transporting the nonwoven web through at least one infrared solvent stripping station wherein infrared radiation irradiates the nonwoven web in the absence of a solvent stripping fluid impinging on the nonwoven web in order to reduce the solvent concentration of the fibers to less than about 10,000 ppmw.

BRIEF DESCRIPTION OF THE DRAWINGS

The accompanying drawings, which are incorporated in and constitute a part of this specification, illustrate the presently contemplated embodiments of the invention and, together with the description, serve to explain the principles of the invention.

DETAILED DESCRIPTION OF THE INVENTION

Figure 1:
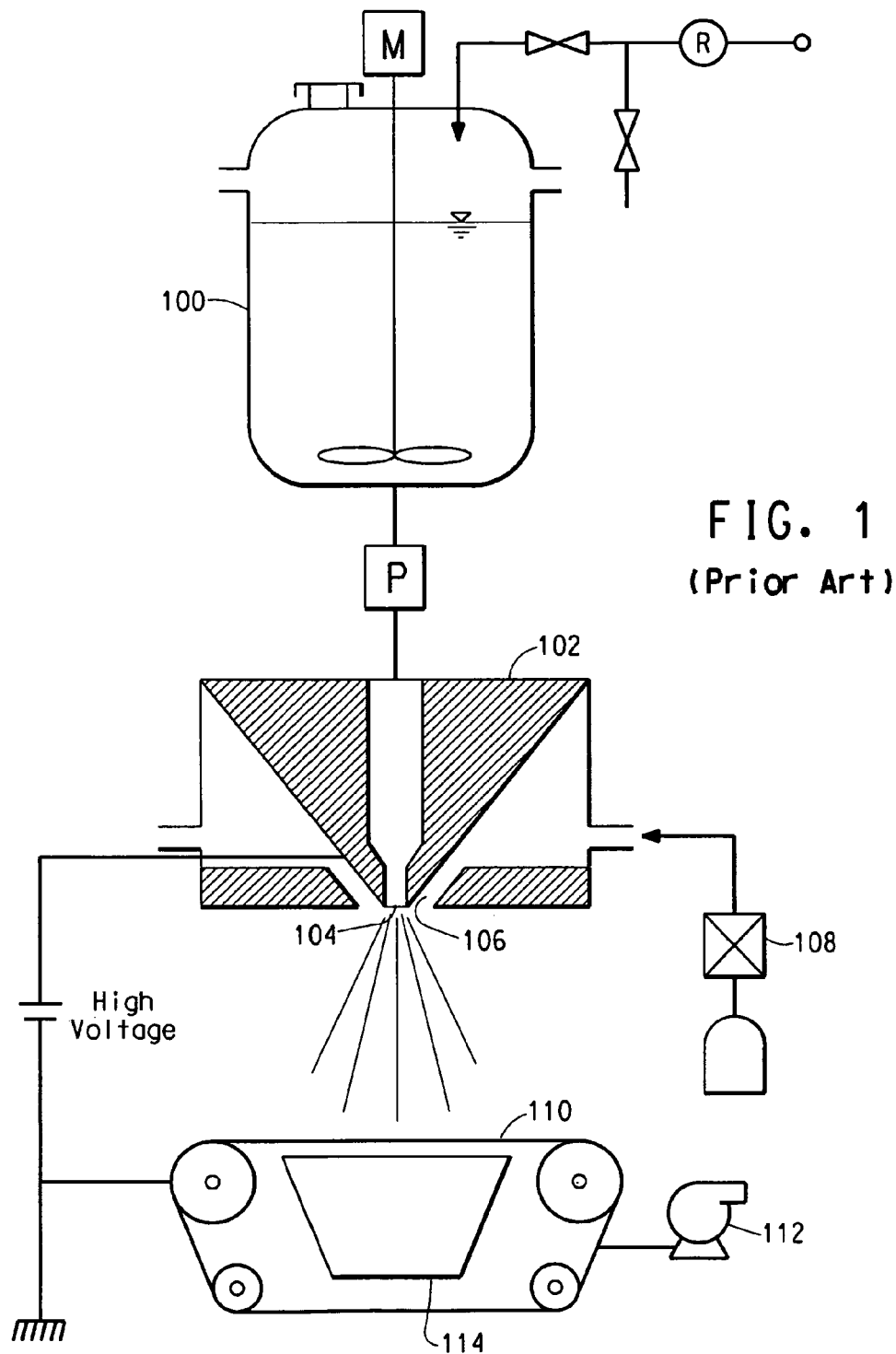
FIG. 1 is a schematic of a prior art electroblowing apparatus for preparing a nanofiber web according to the invention.

The present invention relates to solvent-spun webs and fabrics for a variety of customer end-use applications, such as filtration media, energy storage separators, protective apparel and the like, including at least one nanofiber layer, and a process for removing excess spinning solvent from the solution-spun nanofiber webs or fabrics.

There is a need for fibrous products made from a wide variety of polymers to suit various customer end-use needs. Many polymeric fibers and webs can be formed from melt spinning processes, such as spun bonding and melt blowing. However, the ability to use melt spinning is limited to spinning fibers from polymers which are melt processable, i.e. those which can be softened or melted and flow at elevated temperatures. Still, in many end-uses, it is desirable to utilize polymers which are not melt process able to form fibrous materials, fabrics and webs. In order to form these non-melt-processable polymers into fibrous materials, the technique of solution spinning is used. Also, solution spinning of melt process able polymers can sometimes form fibrous materials, fabrics and webs with different characteristics.

As discussed above, solution spinning processes, such as wet spinning, dry spinning, flash spinning, electrospinning and electroblowing, involve dissolving a desired polymer into a suitable solvent, and spinning fibers from the polymer/solvent solution. Often, the solvent is an organic solvent which has undesirable properties in use of the so-formed fabric, such as adverse health effects, undesired odor and the like.

Unfortunately, when solution spinning large quantities of fabric at high throughput through the spinning dies, such as to form nonwoven webs having basis weights of greater than about 2 grams/square meter (gsm), significant quantities of residual solvent can be entrained in the collected fabrics or fibers, due to either or both of high physical or chemical affinities of the solvent for the polymer so spun, and the lack of sufficient time or space between fiber formation and fiber collection for complete evaporation of the spinning solvent. In many cases, the solvents used in the solution spinning processes demonstrate various levels of toxicity, or present negative environmental effects or cause adverse chemical reactions in particular end-uses. As such, it is preferred to remove as much residual solvent from the solution spun fibrous materials as possible.

In conventional nonwoven fabric spinning processes, the fabric is spun and wound into a large roll in an essentially continuous operation, such that even if the solvent were amenable to evaporation upon sitting, only the solvent entrained in the fabric on the outside of the roll is effectively evaporated, since the underlying fabric within the roll is not exposed to the atmosphere. Detrimentally, even if the fabric were to be provided sufficient time in the unrolled state to permit the spinning solvent to evaporate, an exceedingly long area would be necessary to provide room for the unrolled fabric, and recovery of the evaporated solvent would be difficult and expensive. It Would be desirable to strip the unwanted solvent from the fibers or fabric during the production process, prior to shipping to the customer.

Solvent removal is often complicated by the fact that any particular polymer/solvent spinning system is chosen based upon a strong affinity of the solvent for the polymer, in order to effect complete dissolution of the polymer in the solvent during the spinning operation. In some cases, the fiber polymer is swollen by the solvent; i.e. the solvent molecules are absorbed and dispersed within the polymeric fibers. In other cases the solvent chemically bonds to the polymer molecules making up the fiber, such as by hydrogen bonding, Van der Waals forces, or even ionically via salt formation.

In some conventional solvent spinning processes, such as dry spinning, removal of high affinity solvents is accomplished by spinning the fibers into a hot gas "chimney" of as much as 30 feet in length, and passing high temperature gas (as high as 500° C.) through the chimney to drive off the unwanted solvent. As can be imagined, this process involves an expensive apparatus and is an energy-intensive process.

It has been discovered that one manner of enhancing unwanted solvent removal from solution spun fibers is to reduce the diameter of the fibers themselves, since the diffusion de-volatilization mechanisms follow a 1/diameter$^2$ relationship. That is, entrained solvent will diffuse more readily out of fibers having smaller diameters than out of fibers having larger diameters. According to the present invention, it is preferred that solution spun fibers have diameters less than about 1 micrometer (nanofibers) to optimize the diffusion de-volatilization mechanism of solvent removal.

The term "nanofibers" refers to fibers having diameters varying from a few tens of nanometers up to several hundred nanometers, but generally less than about one micrometer, even less than about 0.8 micrometer, and even less than about 0.5 micrometer.

The solution spun fabrics and webs to be subjected to the process of the present invention include at least one layer of polymeric nanofibers. The nanofibers have average fiber diameters of less than about 1 µm, preferably between about 0.1 µm and about 1 µm, and high enough basis weights to satisfy a variety of commercial end-uses, such as for air/liquid filtration media, energy storage separators, protective apparel and the like.

The process for making commercial quantities and basis weights of nanofiber layer(s) is disclosed in International Publication Number WO2003/080905 (U.S. Ser. No. 10/822, 325), which is hereby incorporated by reference. FIG. 1 is a schematic diagram of an electroblowing apparatus useful for carrying out the process of the present invention using electroblowing (or "electro-blown spinning") as described in International Publication Number WO2003/080905. This prior art electroblowing method comprises feeding a solution of a polymer in a solvent from mixing chamber 100, through a spinning beam 102, to a spinning nozzle 104 to which a high voltage is applied, while compressed gas is directed toward the polymer solution in a blowing gas stream 106 as it exits the nozzle to form nanofibers, and collecting the nanofibers into a web on a grounded collector 110 under vacuum created by vacuum chamber 114 and blower 112.

The moving collection apparatus is preferably a moving collection belt positioned within the electrostatic field between the spinning beam 102 and the collector 110. After being collected, the nanofiber layer is directed to and wound onto a wind-up roll on the downstream side of the spinning beam. Optionally, the nanofiber web can be deposited onto any of a variety of porous scrim materials arranged on the moving collection belt 110, such as spunbonded nonwovens, meltblown nonwovens, needle punched nonwovens, woven fabrics, knit fabrics, apertured films, paper and combinations thereof.

Due to the high throughput of the electroblowing apparatus, typically between about 0.1 to 5 mL/hole/min, and the large number of spinning nozzles (holes) 104 distributed across the spinning beam 102, a single nanofiber layer having a basis weight of between about 2 g/m$^2$ and about 100 g/m$^2$, even between about 10 g/m$^2$ and about 90 g/m$^2$, and even between about 20 g/m$^2$ and about 70 g/m$^2$, as measured on a dry basis, i.e., after the residual solvent has evaporated or been removed, can be made by depositing nanofibers from a single spinning beam in a single pass of the moving collection apparatus. However, also due to the high throughput of the process, significant quantities of residual spinning solvent, especially those solvents with strong affinities for the fiber polymers, can remain in the nanofiber webs so-formed.

It has been discovered that reducing fiber diameter, even to below 1 micrometer, or even to below about 0.8 micrometer, or even below about 0.5 micrometer, is alone insufficient to reduce or eliminate residual solvent from the nanofiber web merely by vacuum-assisted collection.

Figure 2:
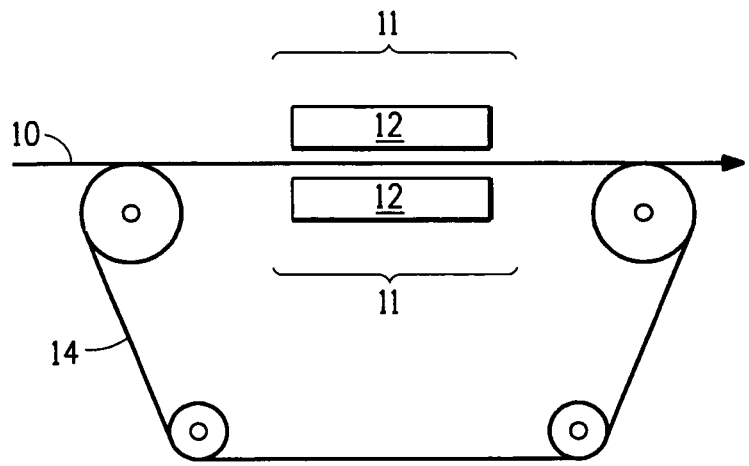
FIG. 2 is a schematic of an infrared solvent stripping station according to the present invention.

Accordingly, the infrared solvent stripping process and apparatus of the present invention, FIG. 2, which is disposed downstream of the collection belt 110 of the prior art apparatus (FIG. 1), acts to effect reduction or elimination of unwanted residual solvent from solution spinning processes in a continuous manner, prior to wind-up of the fabric or web. Alternatively, the infrared solvent stripping process and apparatus of the present invention can be used "off-line" or in a separate process after the as-spun nanofiber web has been collected.

The infrared solvent stripping apparatus comprises an optional continuous moving belt 14 for supporting the solvent spun nanofiber web and its optional supporting scrim 10 and directing it through one or more infrared solvent stripping stations 11, each of which comprise an infrared radiation source 12. The infrared solvent stripping stations 11 can be positioned on either or both sides of the plane of the solvent spun nanofiber web. FIG. 2 shows two infrared solvent stripping stations 11 on opposite sides of the plane of the solvent spun nanofiber web.

U.S. patent application Ser. No. 11/640,625, which is hereby incorporated by reference, describes a process for using infrared solvent stripping stations in the presence of a solvent stripping fluid impinging on a nonwoven web. In contrast, the present invention does not utilize a fluid producing device or a vacuum source to impinge the nonwoven with solvent stripping fluid during the solvent stripping step.

Without wishing to be bound by theory, it is believed that the presence of a stripping fluid, even when heated, can cool the nonwoven web making solvent removal more difficult. In order to counteract this effect, either more infrared energy must be applied or a higher temperature solvent stripping fluid must be employed. Also, as the infrared energy is increased or the temperature of the solvent stripping fluid is increased, the risk of thermally degrading the polymer is increased.

Unexpectedly, it was discovered that using no solvent stripping fluid impinging on the nonwoven web was about as effective or better at removing solvent as using a solvent stripping fluid, as disclosed in U.S. patent application Ser. No. 11/640,625. Thus, the present invention eliminates the cost of providing and heating a solvent stripping fluid.

Utilizing infrared radiation without solvent stripping fluid impinging the nonwoven, it is possible to reduce the solvent concentration in the fiber polymer to less than about 10,000 ppmw, even to less than 1000 ppmw, or even less than about 300 ppmw. The infrared (IR) radiation source can be either a medium wavelength (1.5-5.6 microns) or a short wavelength (0.72-1.5 microns) source, and can be varied in intensity to heat the solvent-laden nanofiber webs to temperatures up to just below the decomposition temperature of the web polymer. We have found that suitable web temperatures can vary from about 120° C. to as high as about 340° C., without decomposition of the web polymer, depending upon the residence time of web exposure to the IR source.

Polymer/solvent combinations which can benefit from the present invention are those in which the polymer exhibits a strong affinity for the solvent, particularly those in which chemical bonding occurs between the polymer and the solvent, such as hydrogen bonding and the like. Some combinations of polymer/solvent which are difficult to separate are polyamide/formic acid and polyvinyl alcohol/water.

Depending on the affinity of the particular spinning solvent for the fiber polymer, it may be advantageous to incorporate more than one infrared solvent stripping station into the solvent stripping apparatus, so as to reduce the residual solvent concentration in multiple steps. In addition, a fluid/vacuum solvent stripping station, as disclosed in U.S. patent application Ser. No. 11/640,625, can also be used.

Figure 3:
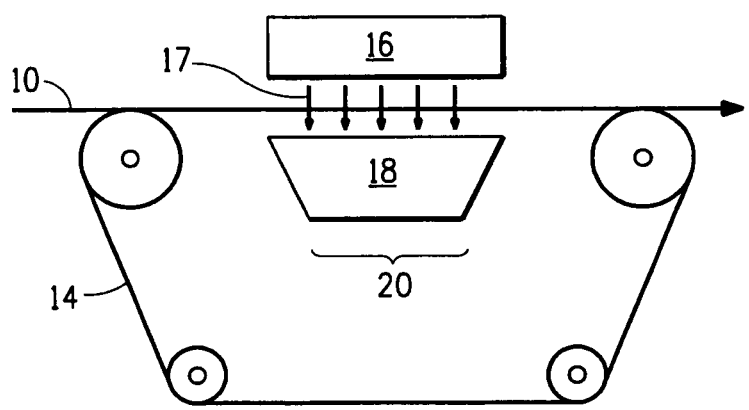
FIG. 3 is a schematic of a fluid/vacuum solvent stripping station according to the present invention.

A fluid/vacuum solvent stripping process and apparatus, FIG. 3, can be disposed downstream of the collection belt 110 of the prior art apparatus (FIG. 1) and disposed either before or after the infrared solvent stripping apparatus, which can further act to effect reduction or elimination of unwanted residual solvent from solution spinning processes in a continuous manner, prior to wind-up of the fabric or web.

The fluid/vacuum solvent stripping apparatus comprises an optional continuous moving belt 14 for supporting the solvent spun nanofiber web and its optional supporting scrim 10 and directing it through one or more solvent stripping stations 20, each of which comprise a fresh solvent stripping fluid heating apparatus 16, disposed on one side of the moving belt 14, and a vacuum apparatus 18, disposed on the opposite side of moving belt 14. The fresh solvent stripping fluid 17, typically air, is impinged upon the moving solution spun web, and the vacuum apparatus helps to draw the stripping fluid through the solution spun web to effect solvent stripping. Preferably, a spent solvent stripping fluid collector (not shown) is disposed downstream of the vacuum apparatus to scrub the excess spinning solvent from the spent stripping fluid for recycling or disposal. The temperature, vacuum pressure and even the fresh solvent stripping fluid itself can be individually controlled within each solvent stripping station.

EXAMPLES

The examples below were prepared from a polymer solution having a concentration of 24 wt % of nylon 6,6 polymer, Zytel® FE3218 (available from E. I. du Pont de Nemours and Company, Wilmington, Del.) dissolved in formic acid solvent at 99% purity (available from Kemira Oyj, Helsinki, Finland) that was electroblown to form a nonwoven web containing some residual solvent.

The residual formic acid content in the nonwoven sheets of nylon was determined using standard wet chemistry techniques and ion chromatography analysis. In a typical determination, a sample of known mass was placed in caustic solution. An aliquot of the resulting solution was analyzed by ion chromatography and the area under the peak corresponding to neutralized formic acid (formate anion) was proportional to the quantity of formic acid in the sample.

Comparative Example A

Comparative Example A was prepared as set forth above and was transported into a fluid/vacuum solvent stripping station on a moving porous screen. A solvent stripping fluid of air at a temperature of 120° C. was impinged onto the nonwoven web from one side while a vacuum was applied to the other side of the nonwoven web. The vacuum was measured at approximately 180 mm $H_2O$. The air pressure and the vacuum were coupled to yield a near constant atmospheric pressure in the solvent stripping station. The nonwoven web remained in the solvent stripping station for 4.3 seconds. The nonwoven web was not subjected to the solvent stripping process of the present invention. The final solvent level was 1820 ppm measured prior to preparing Comparative Example B and Example 1.

Comparative Example B

Comparative Example B was prepared in the same manner as Comparative Example A except it was additionally transported through an infrared solvent stripping station with solvent stripping fluid impinging on the nonwoven web, according to the process of U.S. patent application Ser. No. 11/640,625. This stripping station consisted of a stainless steel belt, a windup station, an infrared heater, a stationary vacuum source located beneath the belt below the infrared heater and two sources of heated air, one impinging normal to the nonwoven web before the infrared heater and one impinging normal to the nonwoven web after the infrared heater. The infrared heater was a Radiant Energy heater, a 3 phase shortwave heater, rated at 12 kW at 240 volts, and was set at a level high enough to heat the web to 180° C. Hot air at a temperature of 100° C. was swept above the web. A vacuum source was located on the opposite side of the nonwoven web from the infrared heaters with a vacuum of 114.3 mm $H_2O$. The web was fed through the dryer at a speed 1.016 meters per minute, corresponding to a total residence time of approximately 15 seconds. The sheet temperature in the oven was measured to be on average 153° C. The final solvent level was 1431 ppm.

Example 1

Example 1 was prepared in the same manner as Comparative Example A except it was additionally transported through an infrared solvent stripping station without solvent stripping fluid impinging on the nonwoven web. The stripping station consisted of a stainless steel belt, a windup station and an infrared heater. The infrared heater was a Radiant Energy heater, a 3 phase shortwave heater, rated at 12 kW at 240 volts, and was set at a level high enough to heat the web to 180° C. No impingement fluid was utilized on either side of the web. The web was fed below the heater at a rate of 1.016 meters per minute, resulting in a residence time of 15 seconds. The final solvent level was 696 ppm.

Comparative Example A shows the effect of a fluid/vacuum solvent stripping station with solvent stripping fluid impinging on the nonwoven web, which removed residual solvent to levels suitable for some commercial uses.

Comparative Example B shows the effect of an infrared based solvent stripping with solvent stripping fluid impingement on the nonwoven web, which removed additional residual solvent.

Example 1 shows the effect of an infrared based solvent stripping without solvent stripping fluid impingement on the nonwoven web, which removed additional residual solvent to an extremely low residual solvent level in the nonwoven web.

Comparative Example C

Comparative Example C was prepared as set forth as in the Examples section above and was transported into a fluid/vacuum solvent stripping station on a moving porous screen. A solvent stripping fluid of air at a temperature of 65° C. was impinged onto the nonwoven web from one side while a vacuum was applied to the other side of the nonwoven web. The vacuum was measured at approximately 100 mm $H_2O$. The air pressure and the vacuum were coupled to yield a near constant atmospheric pressure in the solvent stripping station. The nonwoven web remained in the solvent stripping station for 20 seconds. The nonwoven web was not subjected to the solvent stripping process of the present invention. The final solvent level was 7501 ppm.

Comparative Examples D, E and F

Comparative Examples D, E and F were prepared in the same manner as Comparative Example C except they were additionally transported through an infrared solvent stripping zone with solvent stripping fluid impinging on the nonwoven web. This additional step consisted in transporting the web through a floatation dryer. The dryer consists of three sections composed of two banks of infrared heaters each, both above and below the web. The infrared heaters used were Radplane Series 80 Heaters rated at 31.4 kW, 480 volts, 1 phase, medium wavelength available from GlenRo. Hot air at a temperature of 49° C., 107° C. and 205° C., for Comparative Examples D, E and F respectively, was swept above and below the web countercurrent to the web motion. The web was fed through the dryer at a speed of 12.2 meters per minute, corresponding to a total residence time of approximately 12 seconds. The final solvent levels were 2624 ppm, 596 ppm and 235 ppm, respectively.

Example 2

Example 2 was prepared in the same manner as Comparative Example C except it was additionally transported through an infrared solvent stripping station without solvent stripping fluid impinging on the nonwoven web. This additional step consisted in transporting the web through a floatation dryer. The dryer consists of three sections composed of two banks of infrared heaters each, both above and below the web. The infrared heaters used were Radplane Series 80 Heaters rated at 31.4 kW, 480 volts, 1 phase, medium wavelength available from GlenRo. Unlike Comparative Examples D, E and F, hot air was not swept above and below the web countercurrent to the web motion. The web was fed through the dryer at a speed of 12.2 meters per minute, corresponding to a total residence time of approximately 12 seconds. The final solvent levels were 337 ppm.

Comparative Examples D, E and F show the effect of an infrared based solvent stripping with solvent stripping fluid impingement on the nonwoven web, which removed additional residual solvent. The amount of residual solvent removed is strongly dependent on the temperature of the solvent stripping fluid.

Example 2 shows the effect of an infrared based solvent stripping without solvent stripping fluid impingement on the nonwoven web, which removed additional residual solvent to an extremely low residual solvent level in the nonwoven web. The residual solvent level in the material was almost as low as for Comparative Example F, but the possibility of having polymer degradation was significantly reduced when not using the hot stripping fluid. The data from Comparative Examples D, E and F and Example 2 are summarized in Table 1.

TABLE 1

| Sample | Speed m/min | Blower Output % | Air Temperature ° C. | FA ppm |
|---|---|---|---|---|
| Comparative Example C | — | — | — | 7501 |
| Comparative Example D | 12.2 | 75 | 49 | 2624 |
| Comparative Example E | 12.2 | 75 | 107 | 596 |
| Comparative Example F | 12.2 | 75 | 205 | 235 |
| Example 2 | 12.2 | Off | — | 373 |

These examples demonstrate that the infrared based solvent stripping station of the present invention can prepare a solution spun nonwoven web that is substantially free of spinning solvent.

What is claimed is:

1. A process for stripping chemically bonded spinning solvent from a solution-spun nonwoven web comprising the steps of:

providing a solution-spun nonwoven web comprising solvent-laden polymeric fibers having average fiber diameters of less than about 1 micrometer, where the solvent is the spinning solvent used in the solution spinning process and transporting the nonwoven web through at least one infrared solvent stripping station wherein infrared radiation irradiates the nonwoven web in the absence of a solvent stripping fluid impinging on the nonwoven web in order to reduce the solvent concentration of the fibers to less than about 10,000 ppmw.

2. The process according to claim 1, wherein the average fiber diameter is less than 0.8 micrometer.

3. The process according to claim 2, wherein the average fiber diameter is less than 0.5 micrometer.

4. The process according to claim 1, wherein the solvent concentration is reduced to less than 1,000 ppmw.

5. The process according to claim 4, wherein the solvent concentration is reduced to less than 300 ppmw.

6. The process according to claim 1, wherein the nonwoven web is transported through the solvent stripping station on top of a scrim.

7. The process according to claim 1, further comprising transporting the nonwoven web through at least one fluid/vacuum solvent stripping station before or after the at least one infrared solvent stripping station.

* * * * *